US012683343B2

(12) United States Patent
Ho

(10) Patent No.: US 12,683,343 B2
(45) Date of Patent: Jul. 14, 2026

(54) INSERTING PLATES TO COUPLE BUSBAR GROUP TO RACK BUSBAR GROUP IN ELECTRICAL CONNECTION DEVICE

(71) Applicant: Molex, LLC, Lisle, IL (US)

(72) Inventor: Yi-Tse Ho, New Taipei City (TW)

(73) Assignee: Molex, LLC, Lisle, IL (US)

( * ) Notice: Subject to any disclaimer, the term of this patent is extended or adjusted under 35 U.S.C. 154(b) by 314 days.

(21) Appl. No.: 18/403,765

(22) Filed: Jan. 4, 2024

(65) Prior Publication Data

US 2024/0235137 A1 Jul. 11, 2024

(30) Foreign Application Priority Data

Jan. 6, 2023 (CN) ......................... 202310019839.9

(51) Int. Cl.
*H01R 25/16* (2006.01)
*H01R 13/627* (2006.01)
*H01R 13/631* (2006.01)

(52) U.S. Cl.
CPC ......... *H01R 25/162* (2013.01); *H01R 13/627* (2013.01); *H01R 13/6315* (2013.01)

(58) Field of Classification Search
None
See application file for complete search history.

(56) References Cited

U.S. PATENT DOCUMENTS 7,581,972 B2 * 9/2009 Daamen ............. H01R 13/6315 439/249
10,404,041 B2 * 9/2019 Huang ................... H02G 5/025
10,892,576 B2 1/2021 Lu
2016/0187945 A1 * 6/2016 Tsai ..................... H05K 7/1492 713/310
2024/0243535 A1 * 7/2024 Ho .......................... G06F 1/189

FOREIGN PATENT DOCUMENTS

CN 101369719 A 2/2009
CN 207967527 U 10/2018
CN 109426326 A 3/2019
CN 211743581 U 10/2020
JP 2018160572 A 10/2018

* cited by examiner

*Primary Examiner* — Oscar C Jimenez

(57) ABSTRACT

An electrical connection device includes a busbar group and a rack busbar group. The busbar group includes a first busbar and a second busbar. The first busbar is formed with an inserting groove whose upper end and lower end are in form of opened shape. The second busbar is formed with an inserting groove whose upper end and lower end are in form of opened shape. The rack busbar group includes a first rack busbar, a second rack busbar, a first inserting plate, a second inserting plate, a first floating module, a second floating module and a guiding spacer. The first floating module is provided between the first rack busbar and the first inserting plate, the second floating module is provided between the second rack busbar and the second inserting plate. The busbar group is capable of floating relative to the rack busbar group along an up-down direction and a left-right direction.

12 Claims, 13 Drawing Sheets

INSERTING PLATES TO COUPLE BUSBAR GROUP TO RACK BUSBAR GROUP IN ELECTRICAL CONNECTION DEVICE

RELATED APPLICATION

The present application claims priority to Chinese patent application Ser. No. 202310019839.9 filed on Jan. 6, 2023, which is incorporated by reference in its entirety.

TECHNICAL FIELD

The present disclosure relates to an electrical connection device, and particularly relates to an electrical connection device which is floatingly pluggable.

BACKGROUND

Chinese patent document CN109426326A discloses a busbar group which includes a first connecting busbar and a second connecting busbar. A first outputting portion of the first connecting busbar includes a plurality of first holes, a second outputting portion of the second connecting busbar includes a plurality of second holes, the plurality of first holes and the plurality of second holes correspond to each other. The plurality of first holes and the plurality of second holes are configured to allow a rack busbar of a server rack to be fixed in a gap between the first outputting portion and the second outputting portion, the plurality of first holes and the plurality of second holes may be for example but are not limited to screw holes for screwing. However, the manner that the rack busbar of the server rack is fixed to the first outputting portion and the second outputting portion of a casing is time-consuming and inconvenient to assemble and detach, thereby affecting the convenience of subsequent maintenance.

SUMMARY

Therefore, one of objects of the present disclosure is to provide an electrical connection device which can overcome at least one deficiency of prior art.

Accordingly, an electrical connection device of the present disclosure comprises a busbar group and a rack busbar group. The busbar group comprises a first busbar and a second busbar. The first busbar has a first body, a first transmitting member provided to one side of the first body, and a plurality of first mounting portions provided to the other side of the first body. The first transmitting member comprises a first base plate and at least one first straddle type connector. The first base plate extends upwardly from the one side of the first body, the first straddle type connector is fixed to the first base plate and comprises an insulative housing and a plurality of power terminals provided to the insulative housing. The insulative housing is formed with an inserting groove whose upper end and lower end are in form of opened shape. The second busbar has a second body positioned under the first body, a second transmitting member provided to one side of the second body, and a plurality of second mounting portions provided to the other side of the second body. The second body and the first body are constructed therebetween to be insulated from each other and be not conducted with each other. The second transmitting member comprises a second base plate and at least one second straddle type connector. The second base plate extends upwardly from the one side of the second body, the second straddle type connector is fixed to the second base plate and comprises an insulative housing and a plurality of power terminals provided to the insulative housing. The insulative housing is formed with an inserting groove whose upper end and lower end are in form of opened shape. The rack busbar group comprises a first rack busbar, a second rack busbar, a first inserting plate, a second inserting plate, a first floating module, a second floating module and a guiding spacer. The first floating module is provided between the first rack busbar and the first inserting plate, the second floating module is provided between the second rack busbar and the second inserting plate. The guiding spacer is fixed between the first inserting plate and the second inserting plate, the guiding spacer is configured to space the first inserting plate and the second inserting plate apart from each other and guide the first inserting plate and the second inserting plate to respectively insert into the inserting groove of the first straddle type connector and the inserting groove of the second straddle type connector. By that the inserting groove of the first straddle type connector and the inserting groove of the second straddle type connector respectively allow the first inserting plate and the second inserting plate to insert therein, the busbar group is capable of floating relative to the rack busbar group along an up-down direction, by the first floating module and the second floating module, the busbar group is capable of floating relative to the rack busbar group along a left-right direction.

In some embodiments, the first floating module and the second floating module each comprises a receptacle and a plug, the receptacle of the first floating module is provided to one of the first rack busbar and the first inserting plate, the plug of the first floating module is provided to the other of the first rack busbar and the first inserting plate, the receptacle of the second floating module is provided to one of the second rack busbar and the second inserting plate, the plug of the second floating module is provided to the other of the second rack busbar and the second inserting plate.

In some embodiments, the receptacle comprises a seat body and a contacting member, the seat body is formed with a passageway which extends between two ends of the seat body, the contacting member is provided in the passageway, the plug has an inserting post which inserts into the receptacle and contacts the contacting member.

In some embodiments, the receptacle comprises a seat body, a barrel-shaped member, a pressing member and a contacting member, the seat body is formed with a passageway which extends between two ends of the seat body and an annular receiving groove which radially extends outwardly from the passageway, the barrel-shaped member has a barrel body whose outer diameter is smaller than the passageway and an annular flange which radially extends outwardly from an outer wall surface of the barrel body, the annular flange is movably received in the annular receiving groove, the pressing member has elasticity and is provided between the annular flange of the barrel-shaped member and the annular receiving groove so as to make the barrel-shaped member be capable of floating in the passageway, the contacting member is provided in the barrel body of the barrel-shaped member, the plug has an inserting post which inserts into the receptacle and contacts the contacting member.

In some embodiments, the electrical connection device further comprises: a plurality of connectors, the plurality of the connectors are respectively mounted to the plurality of the first mounting portions of the first busbar and the plurality of the second mounting portions of the second busbar.

In some embodiments, the first transmitting member comprises a plurality of first straddle type connectors which are fixed to the first base plate and are arranged along the up-down direction, the second transmitting member comprises a plurality of second straddle type connectors which are fixed to the second base plate and are arranged along the up-down direction.

In some embodiments, the first transmitting member and the second transmitting member are arranged and spaced apart from each other along the left-right direction, the insulative housing of the first straddle type connector has a first side portion, the insulative housing of the second straddle type connector has a second side portion, the first side portion and the second side portion face each other and spaced apart from each other along the left-right direction, the guiding spacer has a first guiding oblique surface and a second guiding oblique surface which are spaced apart from each other along the left-right direction, a first distance taken between a front end the first guiding oblique surface and a front end of the second guiding oblique surface along the left-right direction is larger than a second distance taken between a rear end of the first guiding oblique surface and a rear end of the second guiding oblique surface along the left-right direction, the first guiding oblique surface is used to contact the first side portion and be capable of sliding on the first side portion, the second guiding oblique surface is used to contact the second side portion and be capable of sliding on the second side portion.

In some embodiments, the first side portion and the second side portion each are an oblique surface, a first pitch taken between a front end of the first side portion and a front end of the second side portion along the left-right direction is larger than a second pitch taken between a rear end of the first side portion and a rear end of the second side portion along the left-right direction, the first side portion and the second side portion is formed therebetween with a snapping groove, when the first inserting plate and the second inserting plate respectively insert into the inserting groove of the first straddle type connector and the inserting groove of the second straddle type connector, the guiding spacer is snapped in the snapping groove, and the first guiding oblique surface and the second guiding oblique surface respectively surface contact the first side portion and the second side portion.

In some embodiments, the rack busbar group further comprises a first engaging assembly and a second engaging assembly, the first engaging assembly makes the first inserting plate and the guiding spacer securely engaged together, the second engaging assembly makes the second inserting plate and the guiding spacer securely engaged together.

In some embodiments, the first engaging assembly comprises a plurality of first nuts and a plurality of first bolts which pass through the first inserting plate and the guiding spacer and are respectively screwed to the plurality of first nuts, the second engaging assembly comprises a plurality of second nuts and a plurality of second bolts which pass through the second inserting plate and the guiding spacer and are respectively screwed to the plurality of second nuts.

Accordingly, an electrical connection device of the present disclosure comprises a busbar group and a rack busbar group. The busbar group comprises a first busbar and a second busbar. The first busbar has a first straddle type connector, the first straddle type connector is formed with an inserting groove whose upper end and lower end are in form of opened shape. The second busbar has a second straddle type connector, the second straddle type connector is formed with an inserting groove whose upper end and lower end are in form of opened shape. The rack busbar group comprises a first rack busbar, a second rack busbar, a first inserting plate provided to the first rack busbar, and a second inserting plate provided to the second rack busbar. The first inserting plate and the second inserting plate respectively insert into the inserting groove of the first straddle type connector and the inserting groove of the second straddle type connector so that the busbar group is capable of floating relative to the rack busbar group along an up-down direction.

Accordingly, an electrical connection device of the present disclosure comprises a busbar group and a rack busbar group. The busbar group comprises a first busbar and a second busbar. The first busbar has a first straddle type connector, the second busbar has a second straddle type connector. The rack busbar group comprises a first rack busbar, a second rack busbar, a first inserting plate, a second inserting plate, a first floating module and a second floating module. The first inserting plate inserts into the first straddle type connector, the second inserting plate inserts into the second straddle type connector. The first floating module is provided between the first rack busbar and the first inserting plate, the second floating module is provided between the second rack busbar and the second inserting plate, so that the busbar group is capable of floating relative to the rack busbar group along a left-right direction.

The present disclosure at least has the following effect: by that the first inserting plate and the second inserting plate of the rack busbar group pluggably insert into the plurality of inserting grooves and the plurality of inserting grooves of the busbar group respectively, the rack busbar group can be rapidly and conveniently assembled to the busbar group and detached from the busbar group to perform maintenance operation. By that the busbar group is capable of floating relative to the rack busbar group along the up-down direction and the busbar group is capable of floating relative to the first rack busbar and the second rack busbar along the left-right direction by means of the first inserting plate and the second inserting plate, a mating process between the busbar group and the rack busbar group can be smoother, and, the busbar group and the rack busbar group can be stably maintained to be in electrical connection state after the busbar group and the rack busbar group mate with each other. Therefore, stability and reliability of the busbar group and the rack busbar group can be promoted after the busbar group and the rack busbar group mate with each other. By the design of the guiding spacer, a position offset in the left-right direction in a process of inserting of the first inserting plate and the second inserting plate can be overcome, so that operation convenience of the rack busbar group mating with the busbar group can be promoted.

BRIEF DESCRIPTION OF THE DRAWINGS

Other features and effects of the present disclosure will be apparent from embodiments with reference to the drawings, in which.

DETAILED DESCRIPTION

Figure 1:
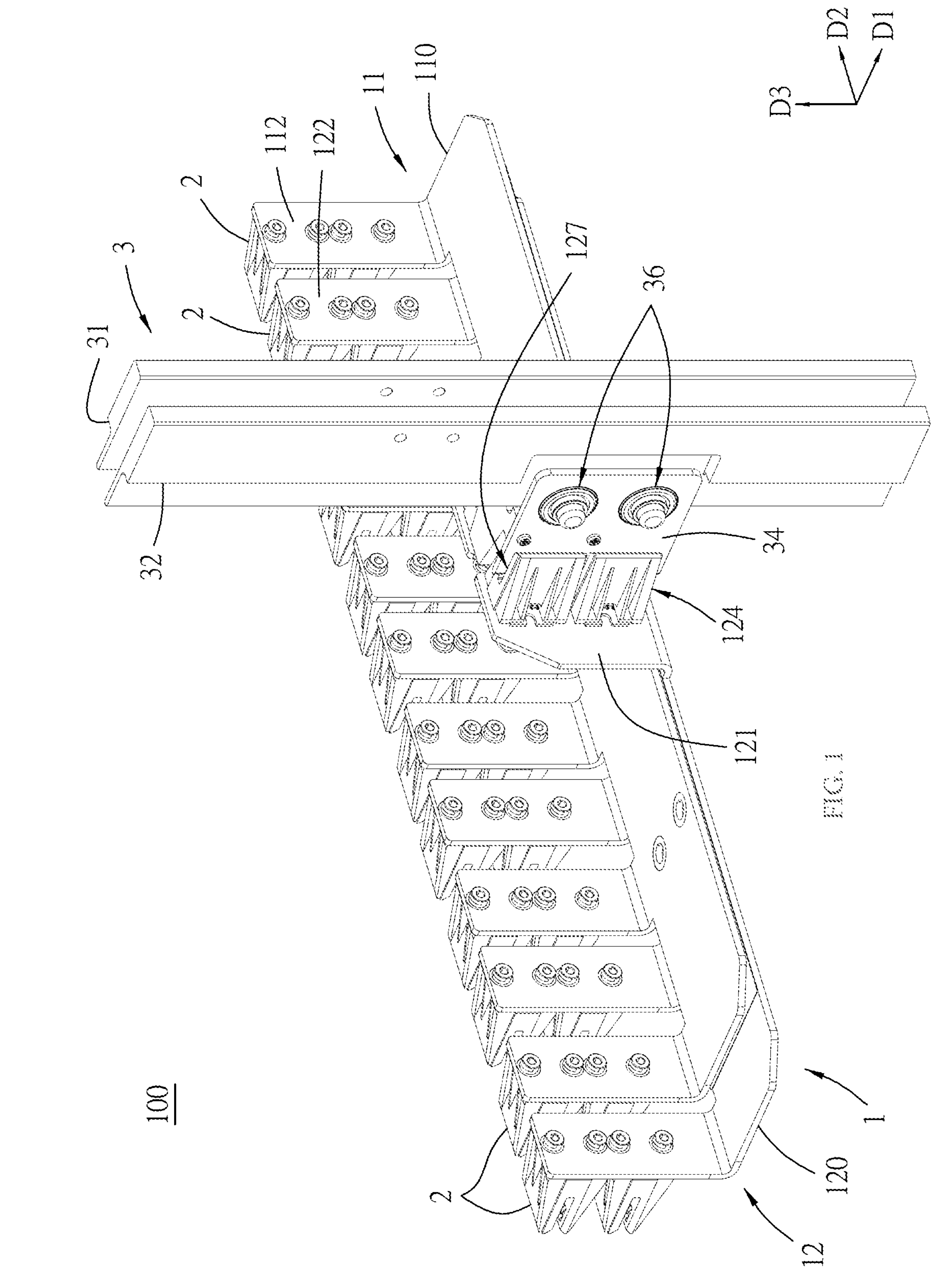
FIG. 1 is a perspective view of an embodiment of an electrical connection device of the present disclosure.

Before the present disclosure is described in detail, it is noted that the similar elements are indicated by the same reference numerals in the following description.

Referring to FIG. 1, an embodiment of an electrical connection device 100 of the present disclosure includes a busbar group 1, a plurality of connectors 2 and a rack busbar group 3. The busbar group 1 and the plurality of connectors 2 are provided to a server box (not shown). The rack busbar group 3 is provided to a server rack (not shown).

For sake of convenience of the later description, in the electrical connection device 100, a front-rear direction D1, a left-right direction D2 perpendicular to the front-rear direction D1 and an up-down direction D3 perpendicular to the front-rear direction D1 and the left-right direction D2 are defined. In FIG. 1, the front-rear direction D1 is that a direction to which an arrow points is front and a direction opposite to front is rear. The left-right direction D2 is that a direction to which an arrow points is left and a direction opposite to left is right. The up-down direction D3 is that a direction to which an arrow points is up and a direction opposite to up is down.

Figure 2:
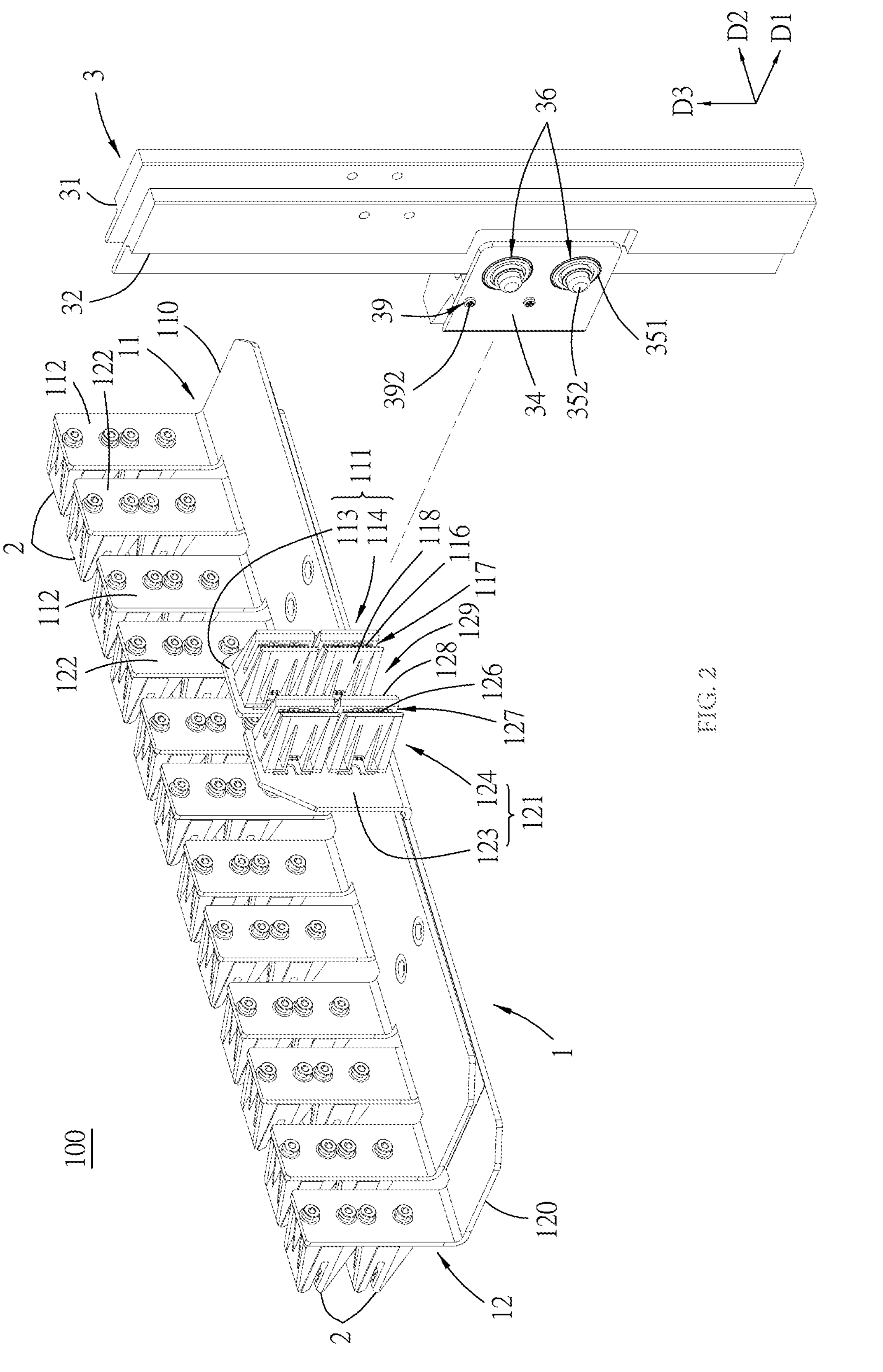
FIG. 2 is a perspective exploded view of the embodiment illustrating an assembling relationship among a busbar group, a plurality of connectors and a rack busbar group.
Figure 3:
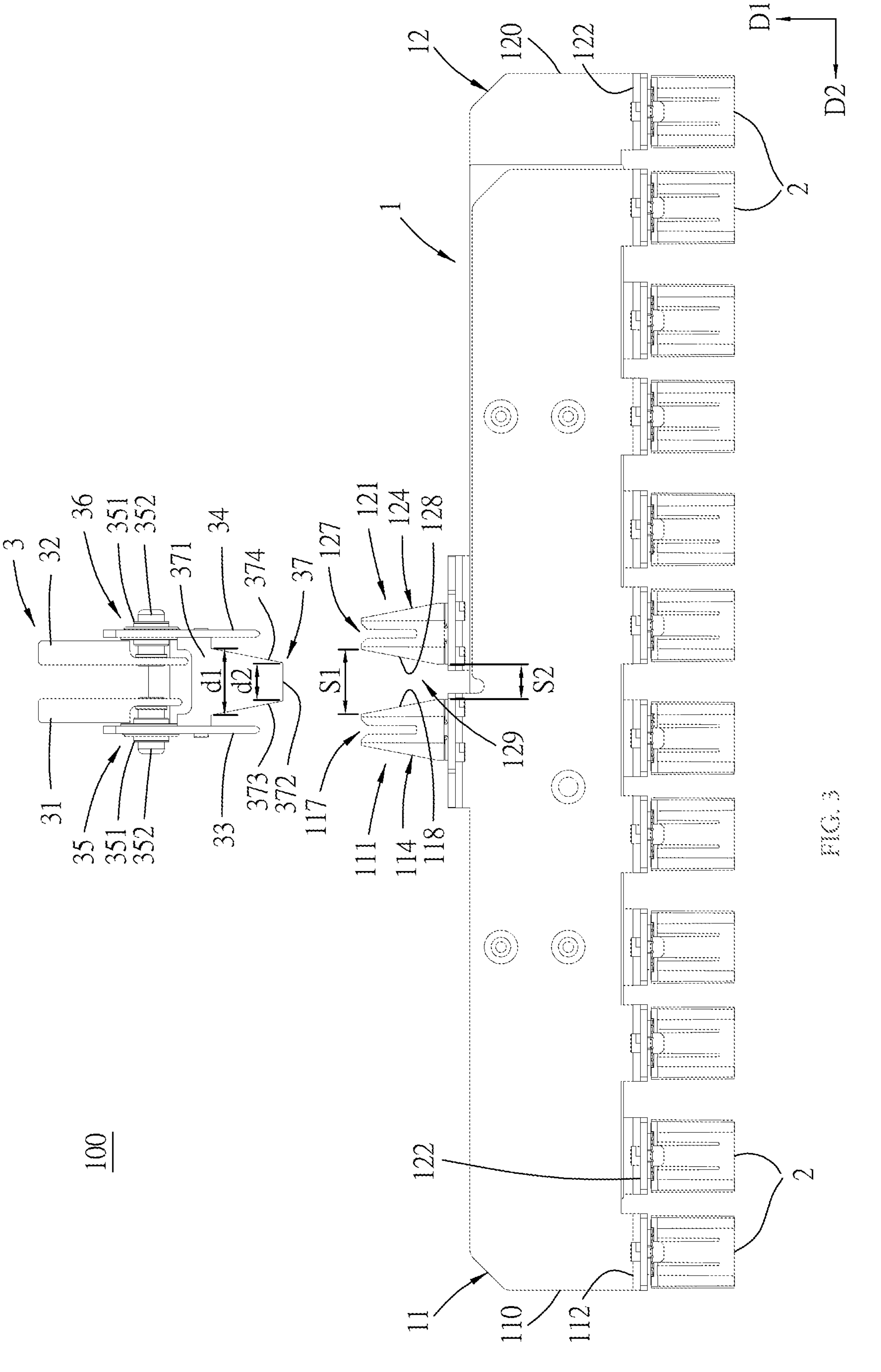
FIG. 3 is a top exploded view of the embodiment.
Figure 4:
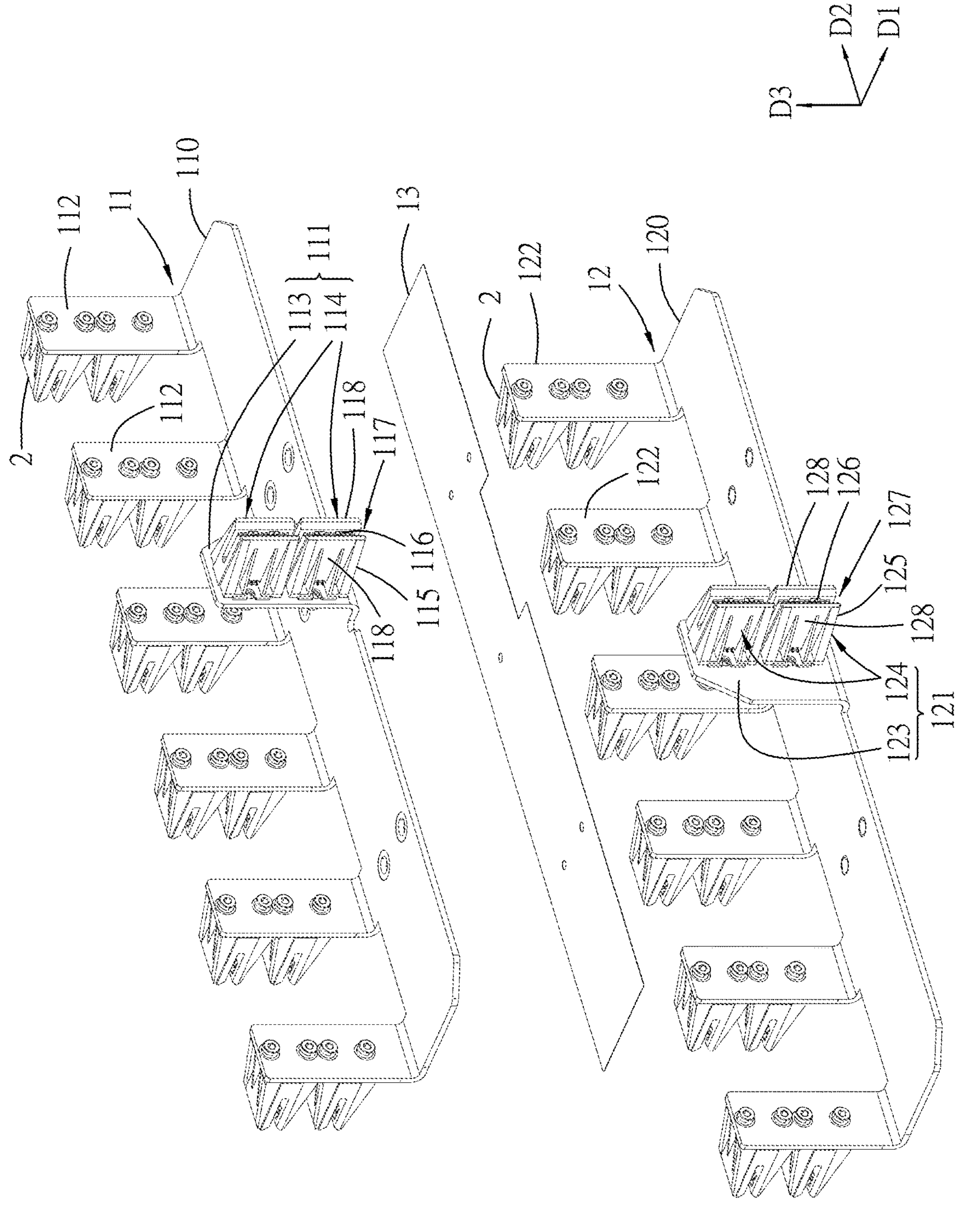
FIG. 4 is a perspective exploded view of the busbar group of the embodiment illustrating an assembling relationship among a first busbar, a second busbar and an insulative layer.

Referring to FIG. 2, FIG. 3 and FIG. 4, the busbar group 1 includes a first busbar 11 and a second busbar 12. The first busbar 11 has a first body 110, a first transmitting member 111 which is provided to one side of the first body 110, and a plurality of first mounting portions 112 which are provided to the other side of the first body 110. The first body 110 is in form of elongated flat plate shape and a length direction of the first body 110 extends along the left-right direction D2. The first transmitting member 111 and the plurality of first mounting portions 112 are respectively provided to a front side of the first body 110 and a rear side of the first body.

The first transmitting member 111 includes a first base plate 113 and a plurality of first straddle type connectors 114. The first base plate 113 integrally extends upwardly from the front side of the first body 110. The first base plate 113 is in form of elongated upright plate shape and a length direction of the first base plate 113 extends along the up-down direction D3. The plurality of first straddle type connectors 114 are fixed to a front plate surface of the first base plate 113 and are arranged along the up-down direction D3. The number of the plurality of first straddle type connectors 114 is two as an example but is not limited thereto. Each first straddle type connector 114 includes a first insulative housing 115 and a plurality of first power terminals 116 provided to the first insulative housing 115. The first insulative housing 115 is fixed to the front plate surface of the first base plate 113 by for example screws for screwing. The first insulative housing 115 is formed with a first mating groove 117 which extends along the up-down direction D3, the first mating groove 117 penetrates the first insulative housing 115 and an upper end and a lower end of the first mating groove 117 are in form of opened shape. The insulative housing 115 has two first side portions 118 which are spaced apart from each other along the left-right direction D2. In the present embodiment, each first side portion 118 takes an oblique surface as an example. Certainly, each first side portion 118 also may be other shape and is not limited to the oblique surface. The two first side portions 118 obliquely extends inwardly from rear to front, a distance between front ends of the two first side portions 118 is smaller than a distance between rear ends of the two first side portions 118. Each power terminal 116 partially extends into the inserting groove 117.

The plurality of first mounting portions 112 integrally extends upwardly from the rear side of the first body 110 and are arranged and spaced apart from each other along the left-right direction D2. Each first mounting portion 112 in form of elongated upright plate shape and a length direction of the first mounting portion 112 extends along the up-down direction D3.

The first body 110, the first base plate 113 and the plurality of first mounting portions 112 of the first busbar 11 are made of a copper material which may carry a high current and has good heat dissipation, the first body 110, the first base plate 113 and the plurality of first mounting portions 112 are formed by a processing, such as stamping and bending.

The second busbar 12 has a second body 120, a second transmitting member 121 which is provided to one side of the second body 120, and a plurality of second mounting portions 122 which are provided to the other side of the second body 120. The second body 120 is in form of elongated flat plate shape and a length direction of the second body 120 extends along the left-right direction D2. The second body 120 is positioned under the first body 110, the second body 120 and the first body 110 are constructed therebetween to be insulated from each other and be not conducted with each other. The second transmitting member 121 and the plurality of second mounting portions 122 are respectively provided to a front side of the second body 120 and a rear side of the second body 120.

The first transmitting member 111 and the second transmitting member 121 are arranged and spaced apart from each other along the left-right direction D2. The second transmitting member 121 includes a second base plate 123 and a plurality of second straddle type connectors 124. The second base plate 123 integrally extends upwardly from the front side of the second body 120. The second base plate 123 is in form of elongated upright plate shape and a length direction of the second base plate 123 extends along the up-down direction D3. The plurality of second straddle type connectors 124 are fixed to a front plate surface of the second base plate 123 and are arranged along the up-down direction D3. The number of the plurality of second straddle type connectors 124 is two as an example but is not limited thereto. Each second straddle type connector 124 includes a second insulative housing 125 and a plurality of second power terminals 126 provided to the second insulative housing 125. The second insulative housing 125 is fixed to the front plate surface of the second base plate 123 by for example screws for screwing. The second insulative housing 125 is formed with a second mating groove 127 which extends along the up-down direction D3, the second mating groove 127 penetrates the second insulative housing 125 and an upper end and a lower end of the second mating groove 127 are in form of opened shape. The insulative housing 125 has two second side portions 128 which are spaced apart from each other along the left-right direction D2. In the present embodiment, each second side portion 128 takes an oblique surface as an example. Certainly, each second side portion 128 also may be other shape but is not limited to the oblique surface. The two second side portions 128 oblique extend inwardly from rear to front, so that a distance between front ends of the two second side portions 128 is smaller than a distance between rear ends of the two second side portions 128. Each second power terminal 126 partially extends into the second mating groove 127.

The first side portion 118 at a right side of each first straddle type connector 114 and the second side portion 128 at a left side of the corresponding second straddle type connector 124 face each other and are spaced apart from each other along the left-right direction D2. A first pitch S1 taken between the front end of the first side portion 118 at the right side and the front end of the second side portion 128 at the left side along the left-right direction D2 is larger than a second pitch S2 taken between the rear end of the first side portion 118 at the right side and the rear end of the second side portion 128 at the left side along the left-right direction D2. The first side portion 118 at the right side of each first straddle type connector 114 and the second side portion 128 at the left side of the corresponding second straddle type connector 124 are formed therebetween with a snapping groove 129.

The plurality of second mounting portions 122 integrally extend upwardly from the rear side of the second body 120 and are arranged and spaced apart from each other along the left-right direction D2. Each second mounting portion 122 is in form of elongated upright plate shape and a length direction of the second mounting portion 122 extends along the up-down direction D3. The plurality of second mounting portions 122 and the plurality of first mounting portions 112 are alternately arranged along the left-right direction D2.

The second body 120, the second base plate 123 and the plurality of second mounting portions 122 of the second busbar 12 are made of a copper material which may carry a high current and has good heat dissipation, the second body 120, the second base plate 123 and the plurality of second mounting portions 122 are formed by a processing, such as stamping and bending.

In order to make that the second body 120 and the first body 110 are constructed therebetween to be insulated from each other and be not conducted with each other, the busbar group 1 of the first embodiment further includes an insulative layer 13 which is provided between the first body 110 and the second body 120, is used to space the first body 110 and the second body 120 apart from each other and avoids the first body 110 and the second body 120 contacting each other and conducting with each other. In the present embodiment, the insulative layer 13 takes an insulative sheet as an example, the insulative layer 13 is adhered between the first body 110 and the second body 120 by for example an insulative adhesive. Certainly, the insulative layer 13 also may be fixed between the first body 110 and the second body 120 by screws for screwing, and is not limited to adhering by the insulative adhesive. The insulative layer 13 also may be constituted by an insulative paint or an insulative adhesive which is coated between the first body 110 and the second body 120, and is not limited to the insulative sheet. That is to say, the insulative layer 13 may be a sheet structural layer constituted by the insulative sheet, also may be the insulative paint or the insulative adhesive constituted by a coating layer.

The plurality of connectors 2 are respectively mounted to the plurality of first mounting portions 112 of the first busbar 11 and the plurality of second mounting portions 122 of the second busbar 12. The corresponding connector 2 which is mounted to each first mounting portion 112 is fixed to a rear plate surface of the first mounting portion 112 by for example screws for screwing. The corresponding connector 2 which is mounted to each second mounting portion 122 is fixed to a rear plate surface of the second mounting portion 122 by for example screws for screwing. The plurality of connectors 2 are used to be electrically connected to a plurality of power supply units (PSU) (not shown) and a plurality of battery backup units (BBU) (not shown) in the server box. In the present embodiment, the first busbar 11 is connected to a positive electrode of each power supply unit or a positive electrode of each battery backup unit by the corresponding connectors 2, and the second busbar 12 is connected to a negative electrode of each power supply unit or a negative electrode of each battery backup unit by the corresponding connectors 2.

Referring to FIG. 2, FIG. 3, FIG. 5 and FIG. 6, the rack busbar group 3 includes a first rack busbar 31, a second rack busbar 32, a first inserting plate 33, a second inserting plate 34, the plurality of first floating modules 35, a plurality of second floating modules 36, a guiding spacer 37, a first engaging assembly 38 and a second engaging assembly 39. The first rack busbar 31 and the second rack busbar 32 are made of a copper material which may carry a high current and has good heat dissipation and are spaced apart from each other along the left-right direction D2. The first rack busbar 31 and the second rack busbar 32 each are in form of long strip shape and length directions of the first rack busbar 31 and the second rack busbar 32 extend along the up-down direction D3. The first inserting plate 33 and the second inserting plate 34 are made of a copper material which may carry a high current and has good heat dissipation, are respectively provided to the first rack busbar 31 and the second rack busbar 32, and are spaced apart from each other along the left-right direction D2. The first inserting plate 33 and the second inserting plate 34 each are in form of upright shape. The first inserting plate 33 partially protrudes from a rear end of the first rack busbar 31, is used to insert into the plurality of inserting grooves 117 of the plurality of first straddle type connectors 114 so as to contact and electrically connect with the power terminals 116. The second inserting plate 34 partially protrudes from a rear end of the second rack busbar 32, is used to insert into the plurality of inserting grooves 127 of the plurality of second straddle type connectors 124 so as to contact and electrically connect with the power terminals 126. Therefore, the first inserting plate 33 and the second inserting plate 34 of the rack busbar group 3 pluggably insert into the plurality of inserting grooves 117 and the plurality of inserting grooves 127 of the busbar group 1 respectively.

The plurality of first floating modules 35 are provided between the first rack busbar 31 and the first inserting plate 33, the plurality of second floating modules 36 are provided between the second rack busbar 32 and the second inserting plate 34. That is to say, in the present embodiment, the first inserting plate 33 is provided to the first rack busbar 31 via the plurality of first floating modules 35, and the second inserting plate 34 is provided to the second rack busbar 32 via the plurality of second floating modules 36. Each first floating module 35 and each second floating module 36 each includes a receptacle 351 and a plug 352. The receptacle 351 and the plug 352 are made of a copper material which may carry a high current and has good heat dissipation. The receptacle 351 of each first floating module 35 is provided to one of the first rack busbar 31 and the first inserting plate 33, the plug 352 of each first floating module 35 is provided to the other of the first rack busbar 31 and the first inserting plate 33. The receptacle 351 of each second floating module 36 is provided to one of the second rack busbar 32 and the second inserting plate 34, the plug 352 of each second floating module 36 is provided to the other of the second rack busbar 32 and the second inserting plate 34. In the present embodiment, that the receptacle 351 and the plug 352 of each first floating module 35 are respectively provided to the first inserting plate 33 and the first rack busbar 31 is taken as an example, but the present disclosure is not limited thereto. That the receptacle 351 and the plug 352 of each second floating module 36 are respectively provided to the second inserting plate 34 and the second rack busbar 32 is taken as an example, but the present disclosure is not limited thereto.

Referring to FIG. 3, FIG. 5, FIG. 7 and FIG. 8, the receptacle 351 includes a seat body 353, a barrel-shaped member 354, two pressing members 355, a contacting member 356 and a fixing ring 357. The seat body 353 is formed with a passageway 358 which extends along the left-right direction D2 between two ends of the seat body 353 and an annular receiving groove 359 which radially extends outwardly from the passageway 358. The barrel-shaped member 354 has a barrel body 360 whose outer diameter is smaller than the passageway 358 and an annular flange 361 which radially extends outwardly from an outer wall surface of the barrel body 360. The annular flange 361 is movably received in the annular receiving groove 359. The two pressing members 355 have elasticity and are provided between the annular flange 361 of the barrel-shaped member 354 and the annular receiving groove 359, so as to make that the barrel-shaped member 354 is capable of floating in the passageway 358. In the present embodiment, each pressing member 355 is a waveform spring annular piece, the two pressing members 355 are respectively provided to two end surfaces of the annular flange 361 in the left-right direction D2, so as to make the barrel-shaped member 354 be capable of radially floating in the passageway 358 in a two-dimensional plane constituted by the front-rear direction D1 and the up-down direction D3 and floating along the left-right direction D2. In other implementing manners of the present embodiment, each pressing member 355 may be other existing elastic members which can be used to apply a pressure, and the pressing member 355 may be one, three or more in number.

The contacting member 356 is provided in the barrel body 360 of the barrel-shaped member 354. The contacting member 356 has an annular head portion 362 which is provided to an inner wall surface of the barrel body 360 and is adjacent to one end edge of the barrel body 360 and a plurality of elastic contacting pieces 363 which obliquely extend inwardly from the annular head portion 362 toward the other end edge of the barrel body 360. The fixing ring 357 and the barrel body 360 of the barrel-shaped member 354 together clamp the annular head portion 362 of the contacting member 356, so as to fix the contacting member 356 in the barrel-shaped member 354. The fixing ring 357 has a clamping portion 364 which is in form of ring shape and clamps the annular head portion 362 together with the inner wall surface of the barrel body 360 and an abutting portion 365 which radially extends outwardly from an end edge of the clamping portion 364 and abuts against the one end edge of the barrel body 360.

The plug 352 has an inserting post 366, the inserting post 611 is used to insert into the barrel-shaped member 354 of the receptacle 351 along the left-right direction D2, so as to contact the plurality of elastic contacting pieces 363 of the contacting member 356. Because the inserting post 366 of the plug 352 inserts into the receptacle 351 along the left-right direction D2 and contacts the contacting member 356, the inserting post 366 of the plug 352 is also capable of floating relative to the contacting member 356 of the receptacle 351 in the left-right direction D2.

By that the plurality of first floating modules 35 are provided between the first rack busbar 31 and the first inserting plate 33, the first rack busbar 31 and the first inserting plate 33 are floatingly connected along the left-right direction D2. By that the plurality of second floating modules 36 are provided between the second rack busbar 32 and the second inserting plate 34, the second rack busbar 32 and the second inserting plate 34 are floatingly connected along the left-right direction D2. Therefore, the first rack busbar 31 and the second rack busbar 32 are capable of floating relative to the first inserting plate 33 and the second inserting plate 34 along the left-right direction D2 respectively.

Figure 5:
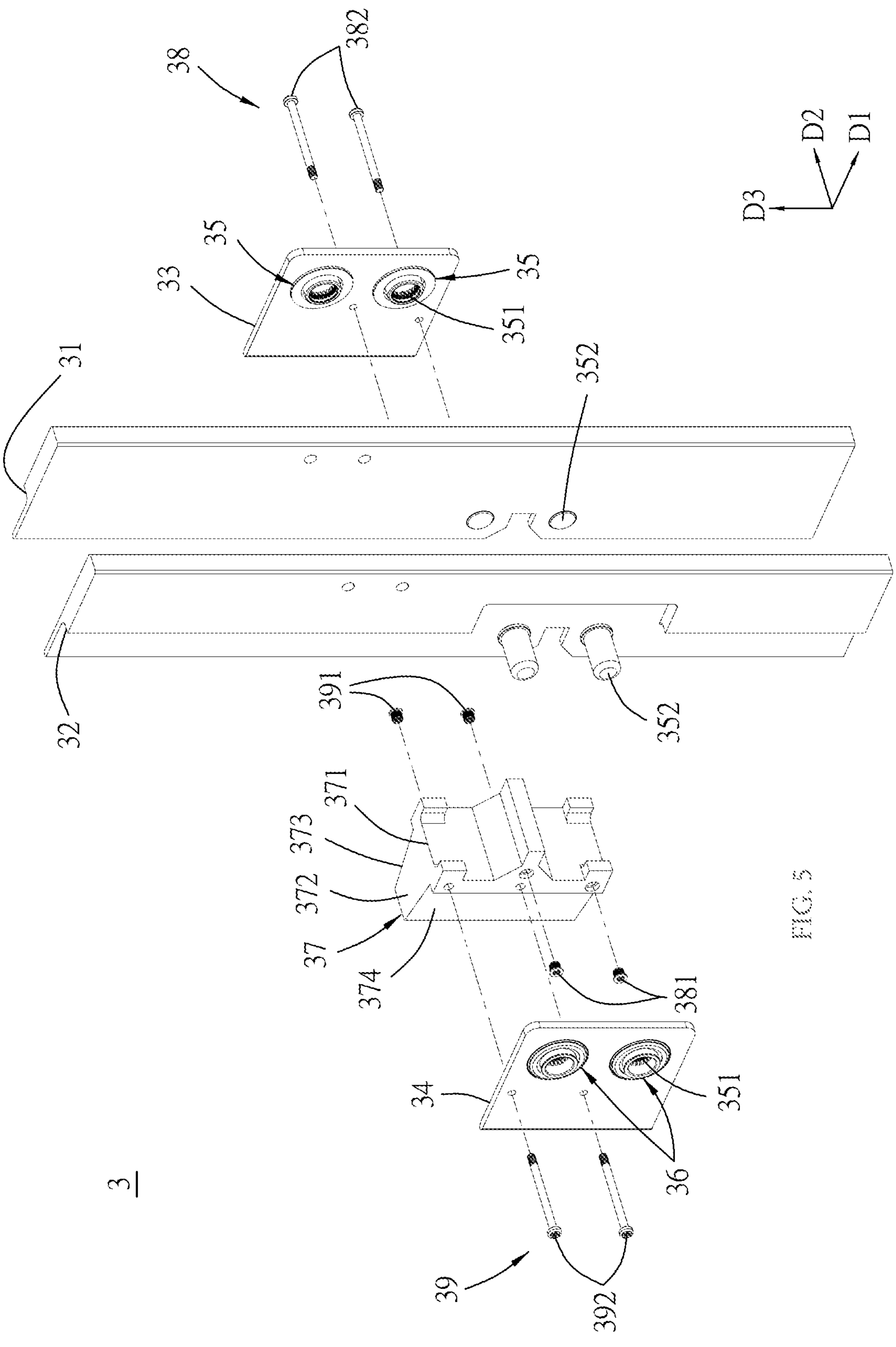
FIG. 5 is a perspective exploded view of the rack busbar group of the embodiment illustrating an assembling relationship among a first rack busbar, a second rack busbar, a first inserting plate, a second inserting plate, a plurality of first floating modules, a plurality of second floating modules, a guiding spacer, a first engaging assembly and a second engaging assembly.
Figure 6:
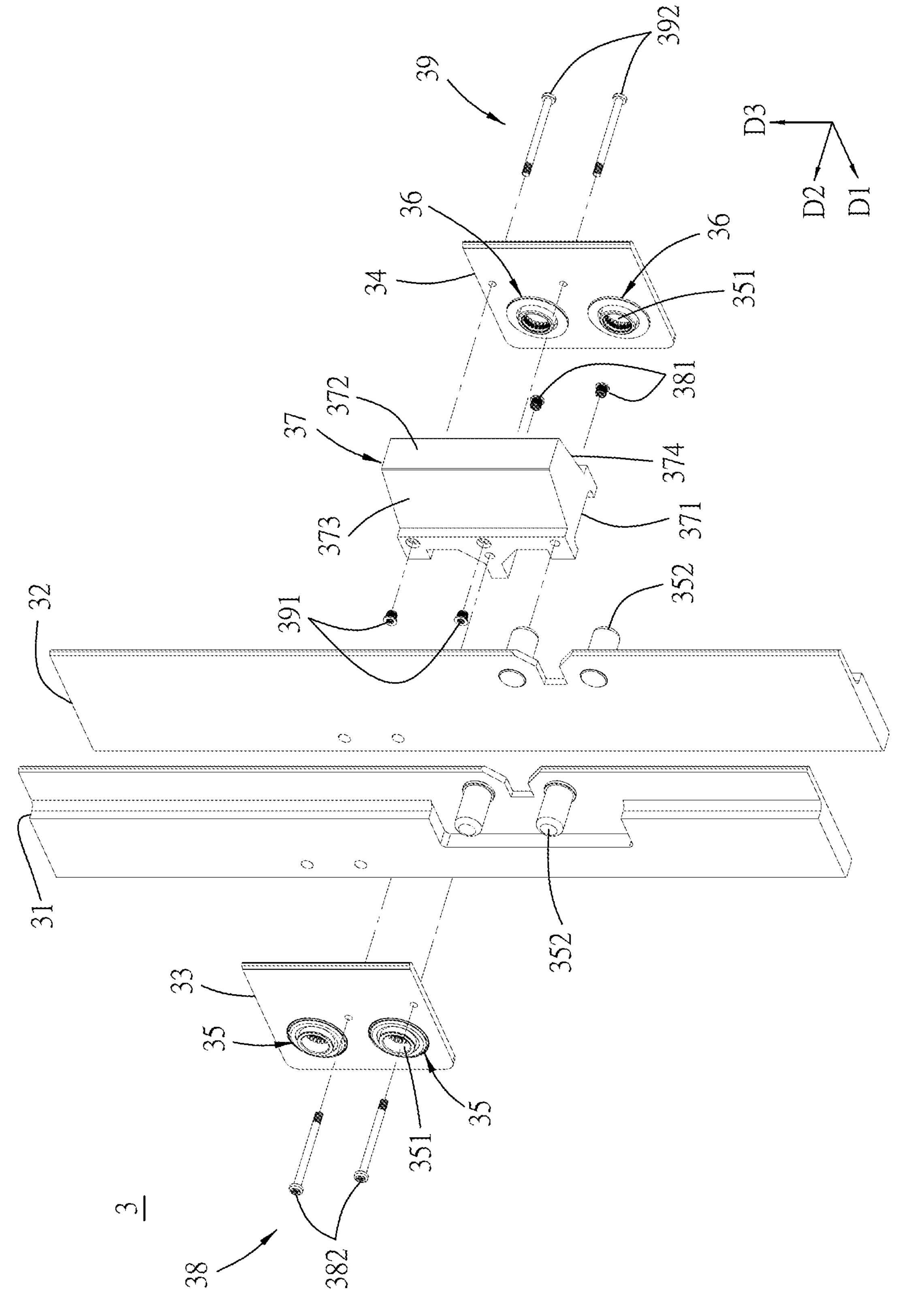
FIG. 6 is a perspective exploded view of the rack busbar group of the embodiment viewed from another angle.
Figure 7:
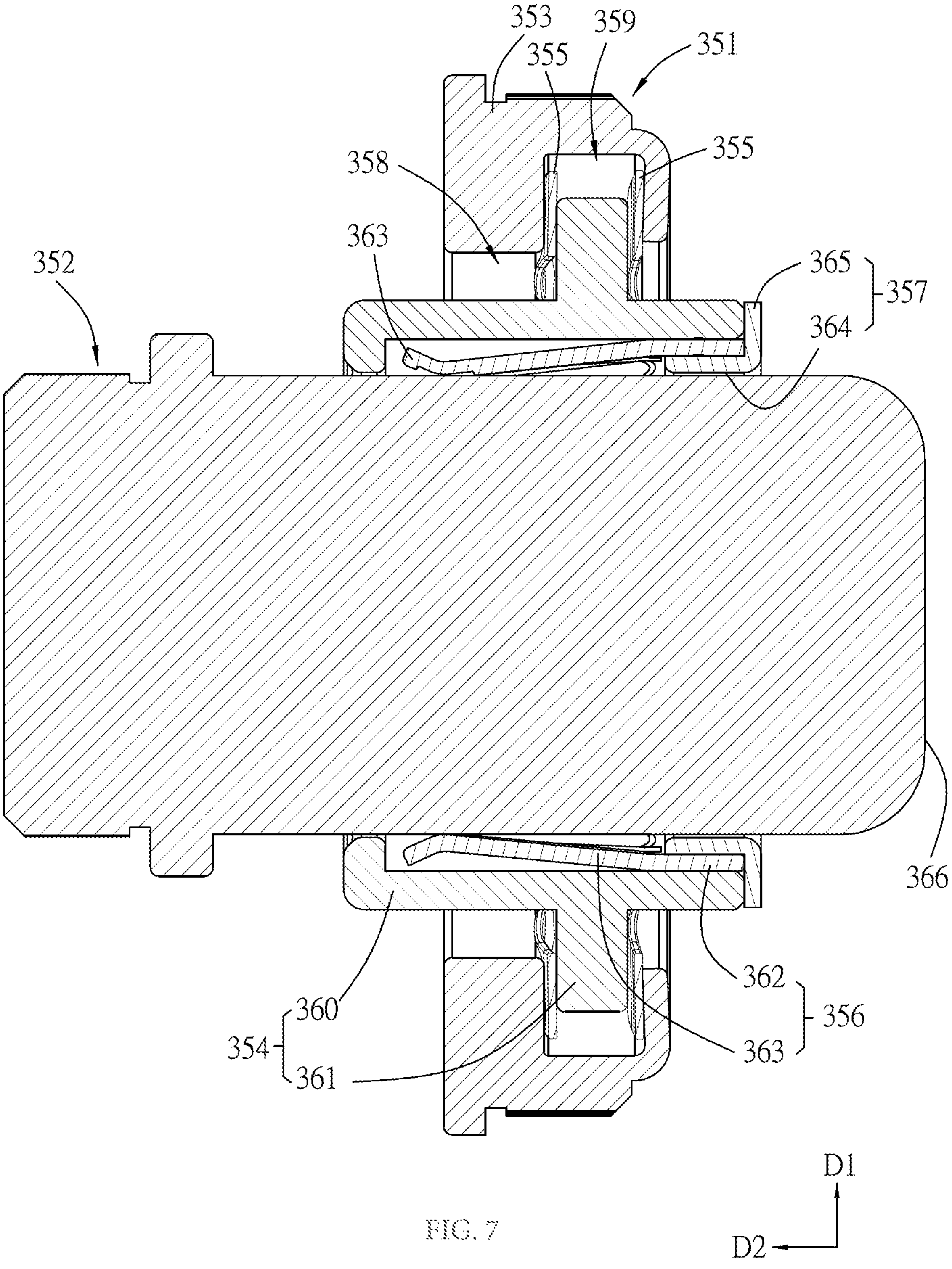
FIG. 7 is a cross sectional view of the first floating module or the second floating module of the embodiment.
Figure 8:
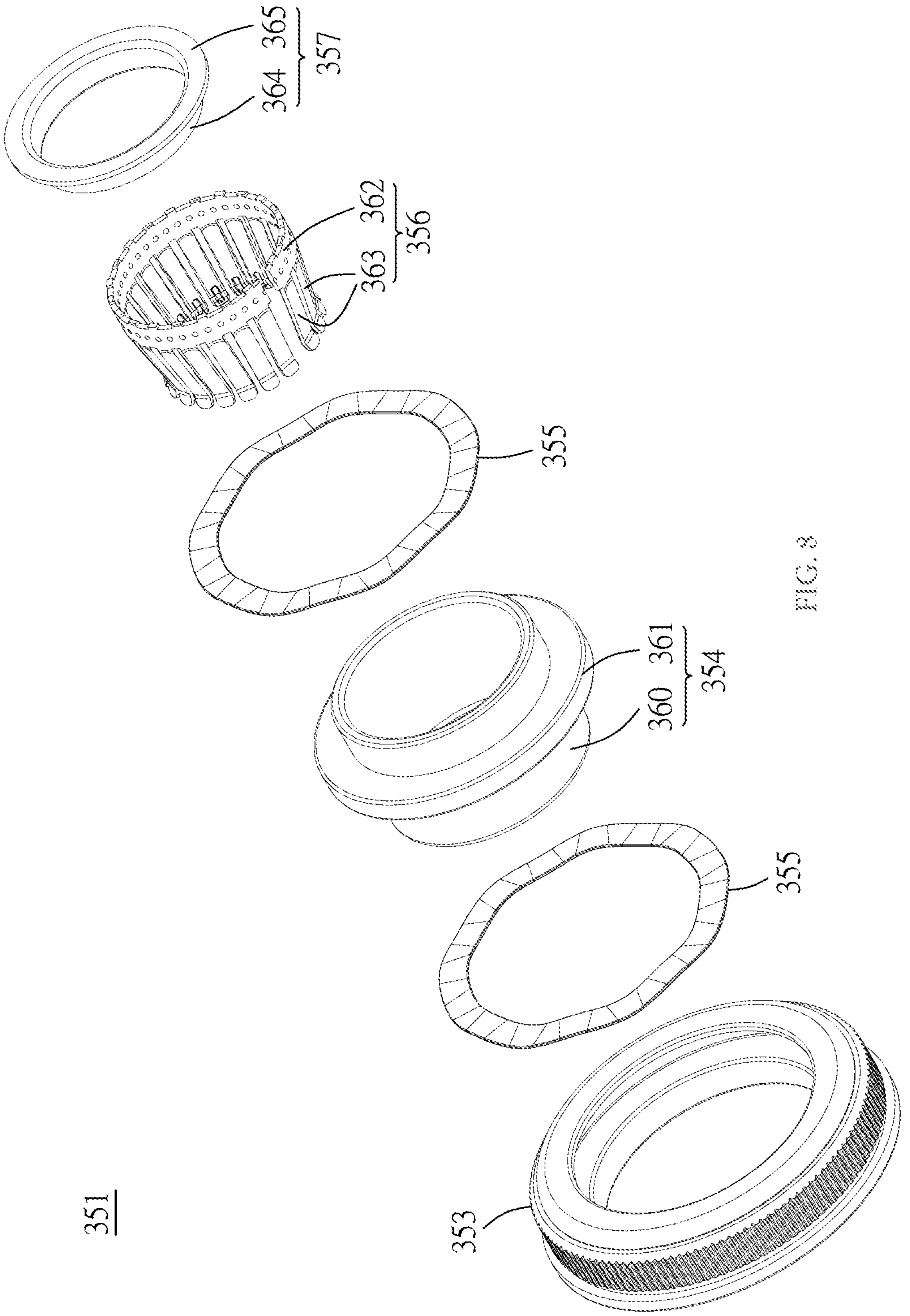
FIG. 8 is a perspective exploded view of a receptacle of the first floating module or the second floating module of the embodiment.

Referring to FIG. 3, FIG. 5 and FIG. 6, the guiding spacer 37 is fixed between the first inserting plate 33 and the second inserting plate 34, the guiding spacer 37 is configured to space the first inserting plate 33 and the second inserting plate 34 apart from each other and guide the first inserting plate 33 and the second inserting plate 34 to respectively insert into the plurality of inserting grooves 117 of the plurality of first straddle type connectors 114 and the plurality of inserting grooves 127 of the plurality of second straddle type connectors 124. The guiding spacer 37 is in form of block shape and has an engaging block 371 and a guiding block 372 which protrudes rearwardly from the engaging block 371. The engaging block 371 is clamped by the first inserting plate 33 and the second inserting plate 34, is used to securely engage with the first inserting plate 33 and the second inserting plate 34. The engaging block 371 of the present embodiment securely engages with the first inserting plate 33 by means of the first engaging assembly 38, and securely engages with the second inserting plate 34 by means of the second engaging assembly 39. The first engaging assembly 38 includes a plurality of first nuts 381 and a plurality of first bolts 382. The plurality of first bolts 382 pass through the first inserting plate 33 and the engaging block 371 of the guiding spacer 37 and are respectively screwed to the plurality of first nuts 381, so that the first inserting plate 33 and the engaging block 371 of the guiding spacer 37 are locked together. The second engaging assembly 39 includes a plurality of second nuts 391 and a plurality of second bolts 392. The plurality of second nuts 391 pass through the second inserting plate 34 and the engaging block 371 of the guiding spacer 37 and are respectively screwed to the plurality of second nuts 391, so that the second inserting plate 34 and the engaging block 371 of the guiding spacer 37 are locked together. Certainly, the first engaging assembly 38 and the second engaging assembly 39 of the present embodiment also each may be other engaging structure, such as a rivet, an adhesive and the like, may be not limited to structure that a nut and a bolt cooperate with each other.

The guiding block 372 has a first guiding oblique surface 373 and a second guiding oblique surface 374 which are spaced apart from each other along the left-right direction D2. The first guiding oblique surface 373 and the second guiding oblique surface 374 obliquely extend inwardly from front to rear, so that a first distance d1 taken between a front end of the first guiding oblique surface 373 and a front end the second guiding oblique surface 374 along the left-right direction D2 is larger than a second distance d2 taken between a rear end of the first guiding oblique surface 373 and a rear end of the second guiding oblique surface 374 along the left-right direction D2. The first guiding oblique surface 373 is used to contact the corresponding first side portion 118 and is capable of sliding on the corresponding first side portion 118. The second guiding oblique surface 374 is used to contact the corresponding second side portion 128 and is capable of sliding on the corresponding second side portion 128.

Referring to FIG. 3, when the first inserting plate 33 and the second inserting plate 34 of the rack busbar group 3 respectively insert into the plurality of inserting grooves 117 and the plurality of inserting grooves 127 of the busbar group 1, the rack busbar group 3 is moved rearwardly toward the busbar group 1.

Figure 9:
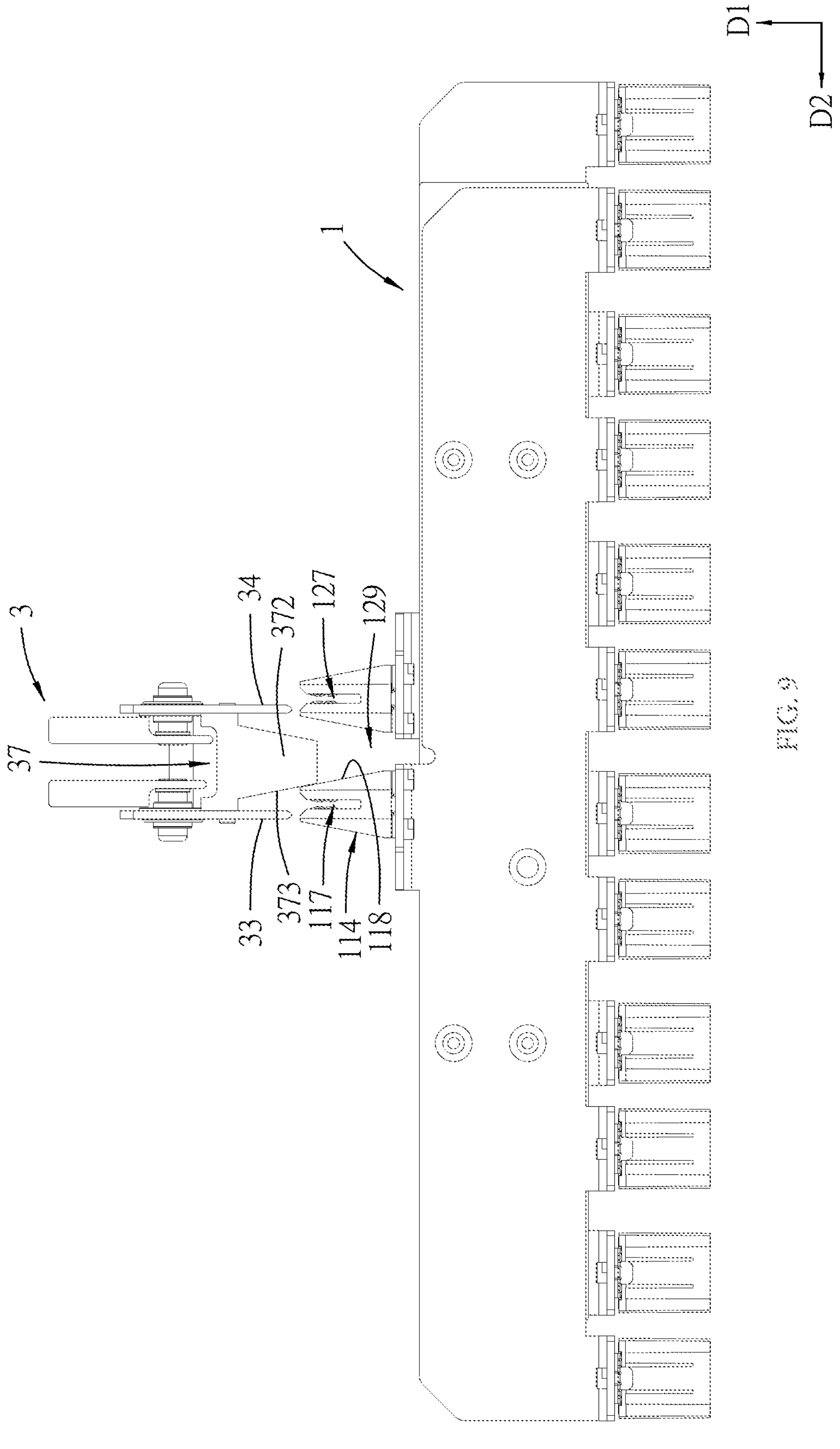
FIG. 9 is a top assembling view of the embodiment of illustrating that the rack busbar group has a position offset to the left such that a first guiding oblique surface of the guiding spacer contacts a corresponding first side portion.
Figure 11:
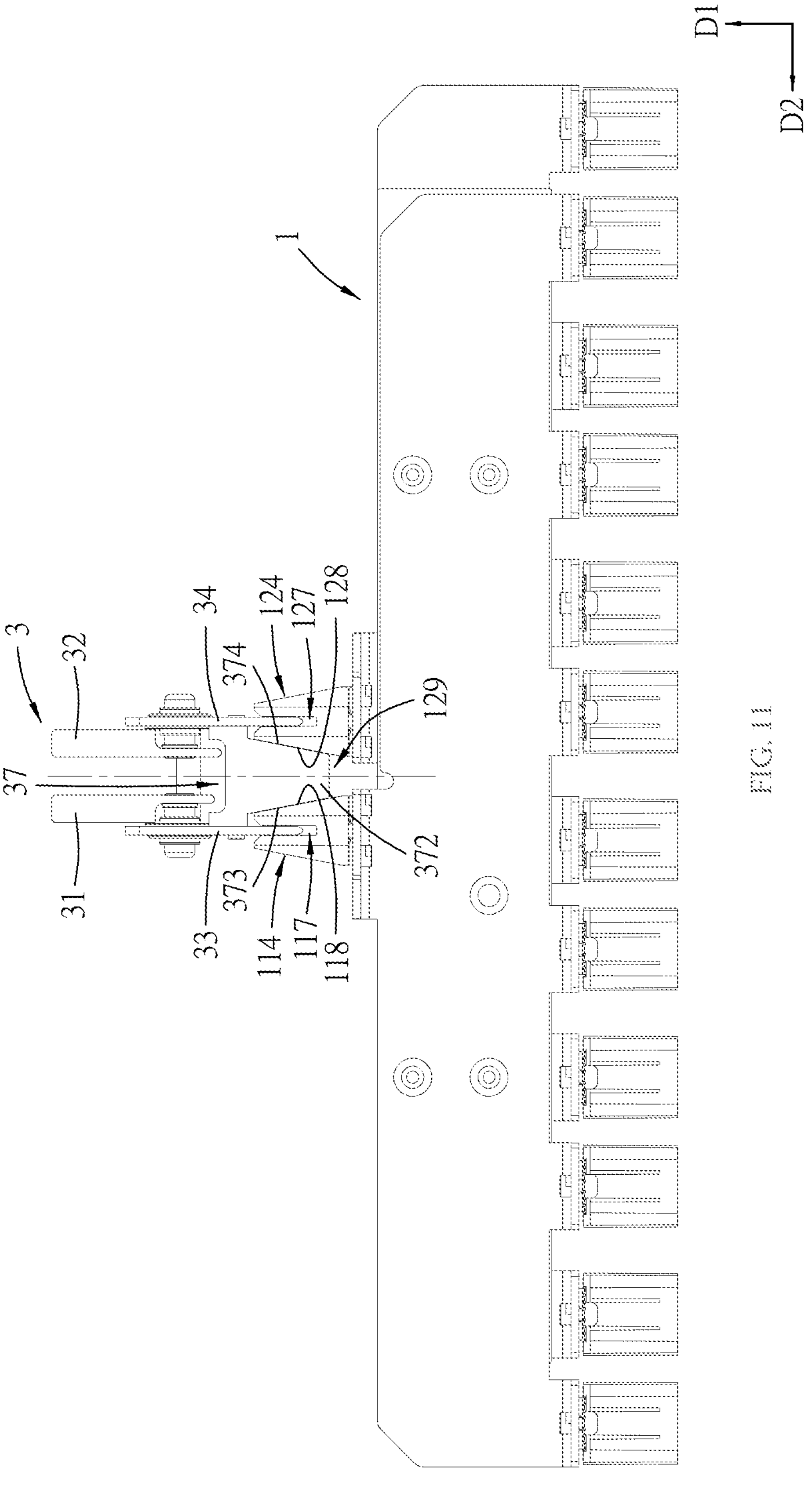
FIG. 11 is a top view of the embodiment.

Referring to FIG. 9 and FIG. 11, when the first inserting plate 33 and the second inserting plate 34 of the rack busbar group 3 have a position offset to the left in the left-right direction D2 and are not aligned with the plurality of inserting grooves 117 and the plurality of inserting grooves 127 respectively, the first guiding oblique surface 373 of the guiding spacer 37 will first contact the corresponding first side portion 118 and slide on the corresponding first side portion 118, in a process that the guiding spacer 37 slides rearwardly, the guiding spacer 37 will at the same time bring the first inserting plate 33 and the second inserting plate 34 to move rightwardly along the left-right direction D2 so as to guide the first inserting plate 33 and the second inserting plate 34 to be correct in position, so that the first inserting plate 33 and the second inserting plate 34 can be aligned with the plurality of inserting grooves 117 and the plurality of inserting grooves 127 respectively. Therefore, the position offset to the left with respect to the first inserting plate 33 and the second inserting plate 34 in the left-right direction D2 can be overcome, the first inserting plate 33 and the second inserting plate 34 can smoothly insert into the plurality of inserting grooves 117 and the plurality of inserting grooves 127 respectively, and can be electrically connected to the power terminals 116 (as shown in FIG. 2) and the power terminals 126 (as shown in FIG. 2) respectively.

Figure 10:
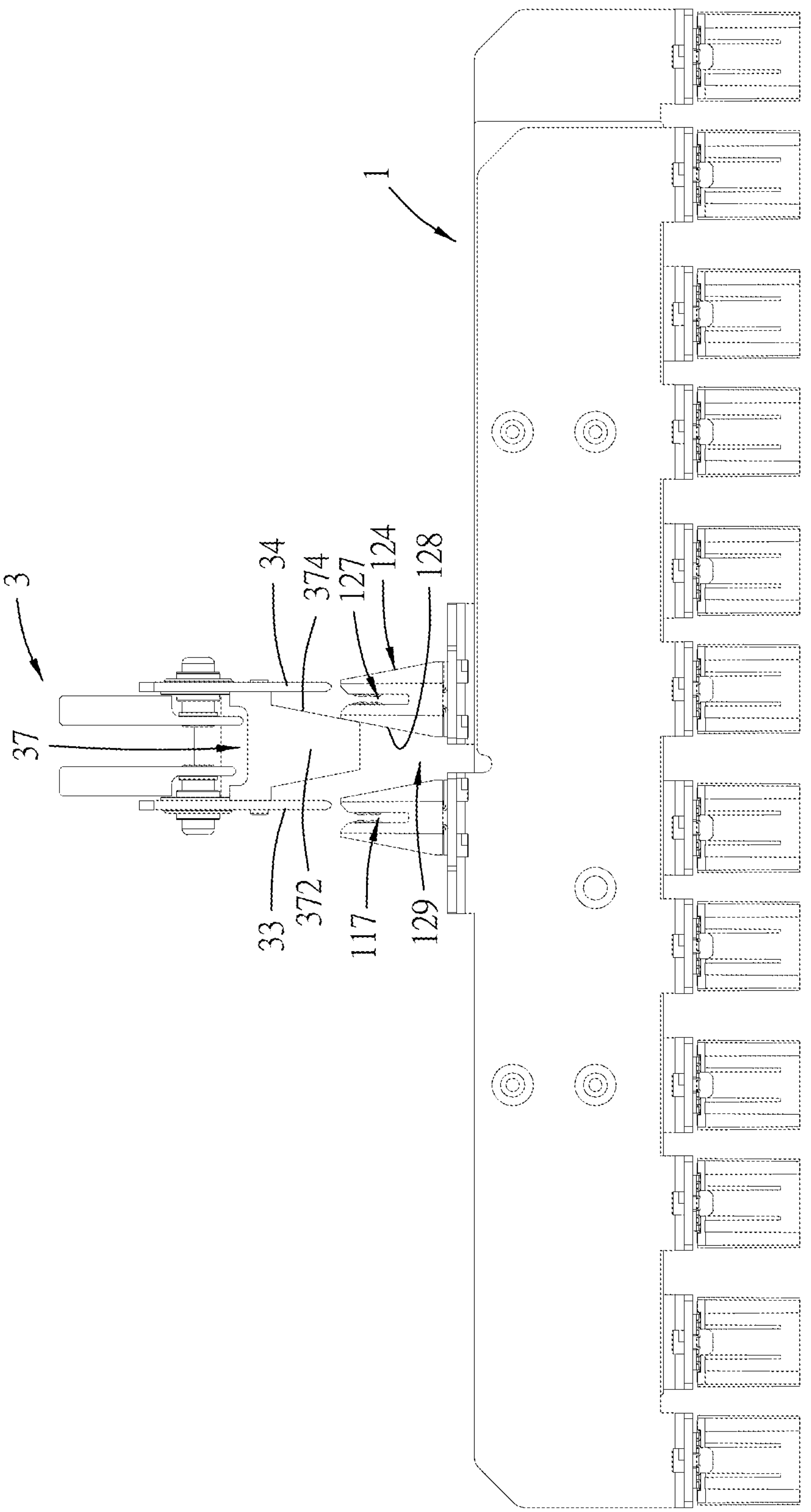
FIG. 10 is a top assembling view of the embodiment illustrating that the rack busbar group has a position offset to the right such that a second guiding oblique surface of the guiding spacer contacts a corresponding second side portion.

Referring to FIG. 10 and FIG. 11, when the first inserting plate 33 and the second inserting plate 34 of the rack busbar group 3 have a position offset to the right in the left-right direction D2 and are not aligned with the plurality of inserting grooves 117 and the plurality of inserting grooves 127, the second guiding oblique surface 374 of the guiding spacer 37 will first contact the corresponding second side portion 128 and slide on the corresponding second side portion 128, in a process that the guiding spacer 37 slides rearwardly, the guiding spacer 3 will at the same time bring the first inserting plate 33 and the second inserting plate 34 to move leftwardly along the left-right direction D2 so as guide the first inserting plate 33 and the second inserting plate 34 to be correct in position, so that the first inserting plate 33 and the second inserting plate 34 can be aligned with the plurality of inserting grooves 117 and the plurality of inserting grooves 127 respectively. Therefore, the position offset to the right with respect to the first inserting plate 33 and the second inserting plate 34 in the left-right direction D2 can be overcome, the first inserting plate 33 and the second inserting plate 34 can smoothly insert into the plurality of inserting grooves 117 and the plurality of inserting grooves 127 respectively, and can be electrically connected to the power terminals 116 (as shown in FIG. 2) and the power terminals 126 (as shown in FIG. 2) respectively.

Referring to FIG. 9, FIG. 10 and FIG. 11, by that the first side portion 118 and the second side portion 128 each are an oblique surface in design, smoothness that the first guiding oblique surface 373 and the second guiding oblique surface 374 respectively slide on the first side portion 118 and the second side portion 128 can be promoted. Moreover, when the first inserting plate 33 and the second inserting plate 34 respectively insert into the plurality of inserting grooves 117 and the plurality of inserting grooves 127, the guiding block 372 of the guiding spacer 37 are snapped in the snapping groove 129, and the first guiding oblique surface 373 and the second guiding oblique surface 374 respectively surface contact the first side portion 118 and the second side portion 128. Therefore, the guiding block 372 of the guiding spacer 37 can be stably clamped by the first straddle type connector 114 and the second straddle type connector 124 to be positioned in the snapping groove 129, so that the first inserting plate 33 and the second inserting plate 34 can stably insert into the plurality of inserting grooves 117 and the plurality of inserting grooves 127 respectively and will not shake along the left-right direction D2, so as to promote stability of electrical connection.

Referring to FIG. 3 and FIG. 11, when the rack busbar group 3 is detached from the busbar group 1, the rack busbar group 3 is directly pulled forwardly so as to make the rack busbar group 3 away from the busbar group 1. When the first inserting plate 33 and the second inserting plate 34 respectively leave the plurality of inserting grooves 117 and the plurality of inserting grooves 127, detaching of the rack busbar group 3 is completed.

Referring to FIG. 1, FIG. 2 and FIG. 11, because the upper end and the lower end of each inserting groove 117, 127 are in form of opened shape, the first inserting plate 33 and the second inserting plate 34 are capable of floatingly insert into the plurality of inserting grooves 117 and the plurality of inserting grooves 127 along the up-down direction D3 respectively. Moreover, when the first inserting plate 33 and the second inserting plate 34 respectively insert into the plurality of inserting grooves 117 and the plurality of inserting grooves 127, the busbar group 1 is capable of floating relative to the rack busbar group 3 along the up-down direction D3.

Figure 12:
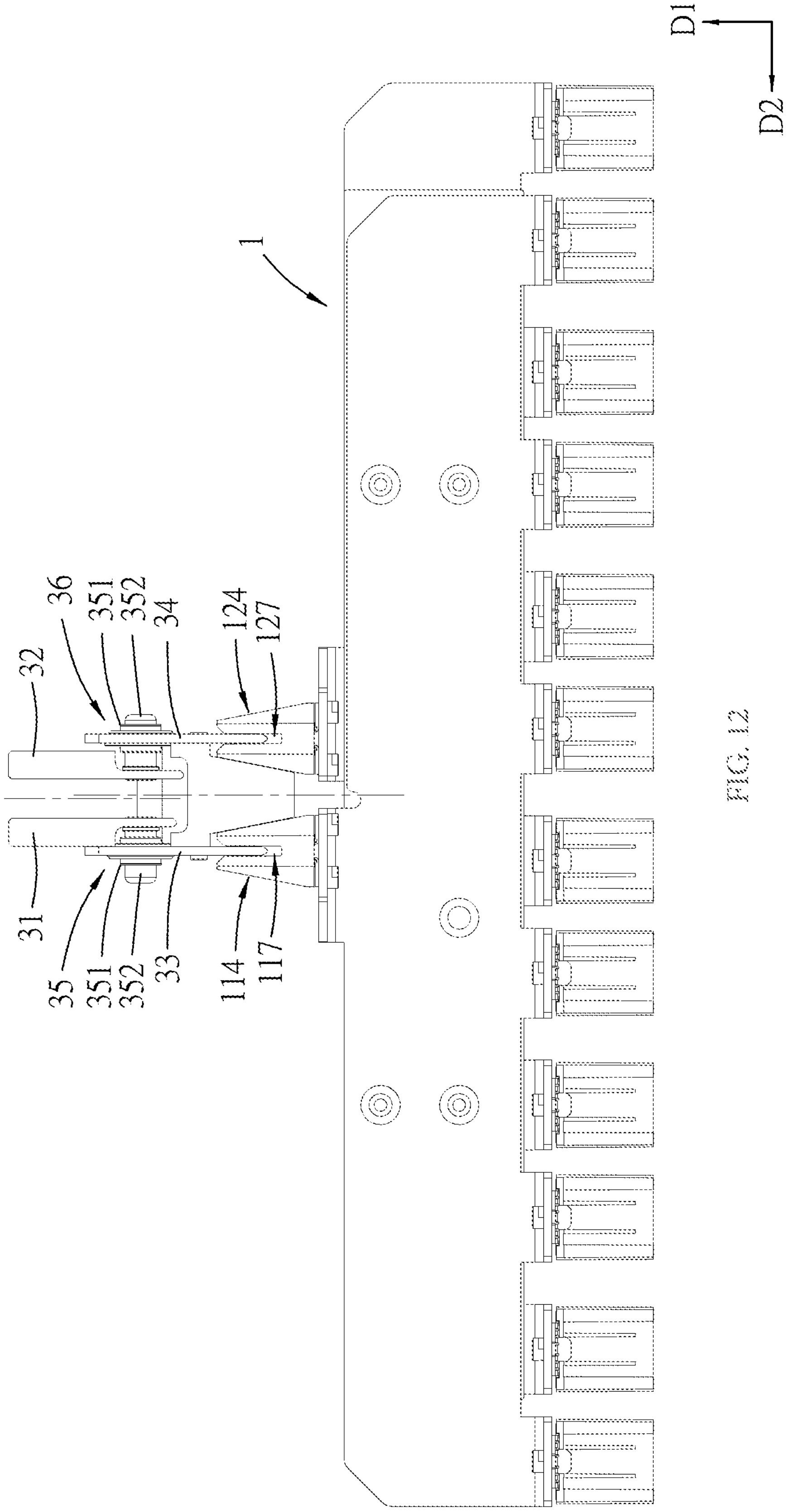
FIG. 12 is a top view of the embodiment illustrating the first inserting plate and the second inserting plate float leftwardly relative to the first rack busbar and the second rack busbar.
Figure 13:
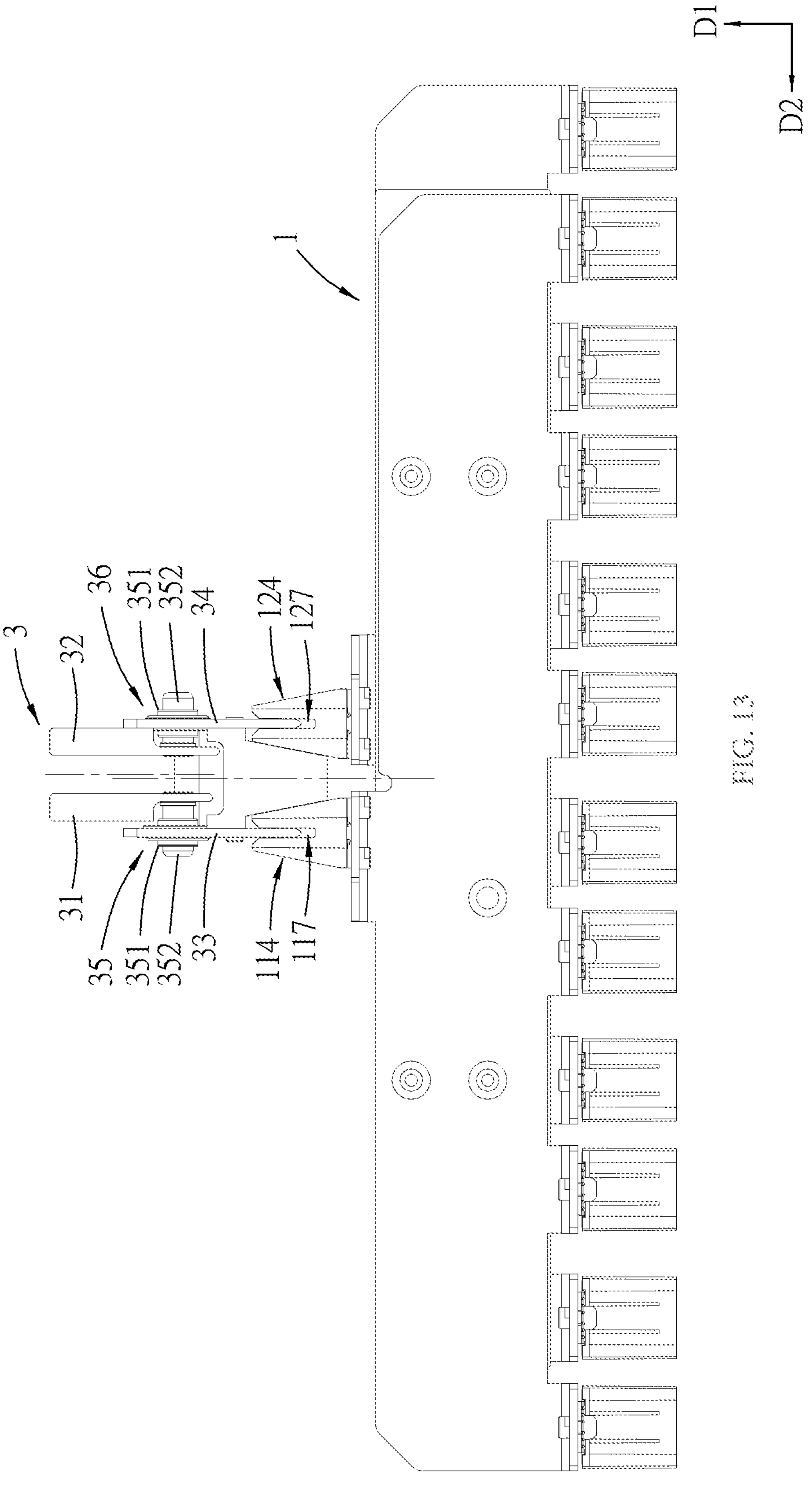
FIG. 13 is a top view of the embodiment illustrating the first inserting plate and the second inserting plate float rightwardly relative to the first rack busbar and the second rack busbar.

Referring to FIG. 11, FIG. 12 and FIG. 13, because the first rack busbar 31 and the second rack busbar 32 are capable of floating relative to the first inserting plate 33 and the second inserting plate 34 along the left-right direction D2 respectively, when the first inserting plate 33 and the second inserting plate 34 respectively insert into the plurality of inserting grooves 117 and the plurality of inserting grooves 127, the busbar group 1 is capable of floating relative to the first rack busbar 31 and the second rack busbar 32 along the left-right direction D2 by means of the first inserting plate 33 and the second inserting plate 34. FIG. 12 shows that the busbar group 1 floats leftwardly relative to the first rack busbar 31 and the second rack busbar 32 along the left-right direction D2 by means of the first inserting plate 33 and the second inserting plate 34. FIG. 13 shows that the busbar group 1 floats rightwardly relative to the first rack busbar 31 and the second rack busbar 32 along the left-right direction D2 by means of the first inserting plate 33 and the second inserting plate 34.

By that the first inserting plate 33 and the second inserting plate 34 of the rack busbar group 3 pluggably insert into the plurality of inserting grooves 117 and the plurality of inserting grooves 127 of the busbar group 1 respectively, the rack busbar group 3 can be rapidly and conveniently assembled on the busbar group 1, and can be detached from the busbar group 1 to perform maintenance operation. By that the plurality of first straddle type connectors 114 and the plurality of second straddle type connectors 124 of the busbar group 1 are capable of respectively allowing the first inserting plate 33 and the second inserting plate 34 to insert therein, the busbar group 1 and the rack busbar group 3 do not need therebetween to be adapted by other component, so that the number of components and manufacturing cost of the electrical connection device 100 can be lowered.

By that the busbar group 1 is capable of floating relative to the rack busbar group 3 along the up-down direction D3 and the busbar group 1 is capable of floating relative to the first rack busbar 31 and the second rack busbar 32 along the left-right direction D2 by means of the first inserting plate 33 and the second inserting plate 34, a mating process between the busbar group 1 and the rack busbar group 3 can be smoother, and the busbar group 1 and the rack busbar group 3 can be stably maintained to be in electrical connection state after the busbar group 1 and the rack busbar group 3 mate with each other. Therefore, stability and reliability of the busbar group 1 and the rack busbar group 3 can be promoted after the busbar group 1 and the rack busbar group 3 mate with each other.

By that the design of the guiding spacer 37, a position offset in the left-right direction D2 in a process of inserting of the first inserting plate 33 and the second inserting plate 34 can be overcome, so that operation convenience of the rack busbar group 3 mating with the busbar group 1 can be promoted.

It is noted that, the electrical connection device 100 of the present embodiment also may have following implementing manners as desired.

One implementing manner: the first straddle type connector 114 and the second straddle type connector 124 each are provided as one in number.

Another implementing manner: the first floating module 35 and the second floating module 36 each are provided as one in number.

Still another implementing manner: the rack busbar group 3 is provided only by means of the first inserting plate 33 and the second inserting plate 34 which respectively cooperate with the inserting groove 117 of the first straddle type connector 114 and the inserting groove 127 of the second straddle type connector 124 of the busbar group 1, so as to achieve the effect that the busbar group 1 is capable of floating relative to the rack busbar group 3 along the up-down direction D3.

Yet another implementing manner: the rack busbar group 3 is provided only by means of the first floating module 35 and the second floating module 36, so as to achieve the effect that the busbar group 1 is capable of floating relative to the rack busbar group 3 along the left-right direction D2.

In conclusion, in the electrical connection device 100 of the present embodiment, by that the first inserting plate 33 and the second inserting plate 34 of the rack busbar group 3 pluggably insert into the plurality of inserting grooves 117 and the plurality of inserting grooves 127 of the busbar group 1 respectively, the rack busbar group 3 can be rapidly and conveniently assembled to the busbar group 1 and detached from the busbar group 1 to perform maintenance operation. By that the busbar group 1 is capable of floating relative to the rack busbar group 3 along the up-down direction D3 and the busbar group 1 is capable of floating relative to the first rack busbar 31 and the second rack busbar 32 along the left-right direction D2 by means of the first inserting plate 33 and the second inserting plate 34, a mating process between the busbar group 1 and the rack busbar group 3 can be smoother, and, the busbar group 1 and the rack busbar group 3 can be stably maintained to be in electrical connection state after the busbar group 1 and the rack busbar group 3 mate with each other. Therefore, stability and reliability of the busbar group 1 and the rack busbar group 3 can be promoted after the busbar group 1 and the rack busbar group 3 mate with each other. By the design of the guiding spacer 37, a position offset in the left-right direction D2 in a process of inserting of the first inserting plate 33 and the second inserting plate 34 can be overcome, so that operation convenience of the rack busbar group 3 mating with the busbar group 1 can be promoted. Therefore, the object of the present disclosure can be achieved indeed.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device, comprising:

a busbar group comprising:

a first busbar having a first body, a first transmitting member provided to one side of the first body, and a plurality of first mounting portions provided to the other side of the first body, the first transmitting member comprising a first base plate and at least one first straddle type connector, the first base plate extending upwardly from the one side of the first body, the first straddle type connector being fixed to the first base plate and comprising an insulative housing and a plurality of power terminals provided to the insulative housing, the insulative housing being formed with an inserting groove whose upper end and lower end are in form of opened shape; and a second busbar having a second body positioned under the first body, a second transmitting member provided to one side of the second body, and a plurality of second mounting portions provided to the other side of the second body, the second body and the first body being constructed therebetween to be insulated from each other and be not conducted with each other, the second transmitting member comprising a second base plate and at least one second straddle type connector, the second base plate extending upwardly from the one side of the second body, the second straddle type connector being fixed to the second base plate and comprising an insulative housing and a plurality of power terminals provided to the insulative housing, the insulative housing being formed with an inserting groove whose upper end and lower end are in form of opened shape; and a rack busbar group comprising a first rack busbar, a second rack busbar, a first inserting plate, a second inserting plate, a first floating module, a second floating module and a guiding spacer, the first floating module being provided between the first rack busbar and the first inserting plate, the second floating module being provided between the second rack busbar and the second inserting plate, the guiding spacer being fixed between the first inserting plate and the second inserting plate, the guiding spacer being configured to space the first inserting plate and the second inserting plate apart from each other and guide the first inserting plate and the second inserting plate to respectively insert into the inserting groove of the first straddle type connector and the inserting groove of the second straddle type connector, by that the inserting groove of the first straddle type connector and the inserting groove of the second straddle type connector respectively allow the first inserting plate and the second inserting plate to insert therein, the busbar group being capable of floating relative to the rack busbar group along an up-down direction, by the first floating module and the second floating module, the busbar group being capable of floating relative to the rack busbar group along a left-right direction.

2. The electrical connection device of claim 1, wherein the first floating module and the second floating module each comprises a receptacle and a plug, the receptacle of the first floating module is provided to one of the first rack busbar and the first inserting plate, the plug of the first floating module is provided to the other of the first rack busbar and the first inserting plate, the receptacle of the second floating module is provided to one of the second rack busbar and the second inserting plate, the plug of the second floating module is provided to the other of the second rack busbar and the second inserting plate.

3. The electrical connection device of claim 2, wherein the receptacle comprises a seat body and a contacting member, the seat body is formed with a passageway which extends between two ends of the seat body, the contacting member is provided in the passageway, the plug has an inserting post which inserts into the receptacle and contacts the contacting member.

4. The electrical connection device of claim 2, wherein the receptacle comprises a seat body, a barrel-shaped member, a pressing member and a contacting member, the seat body is formed with a passageway which extends between two ends of the seat body and an annular receiving groove which radially extends outwardly from the passageway, the barrel-shaped member has a barrel body whose outer diameter is smaller than the passageway and an annular flange which radially extends outwardly from an outer wall surface of the barrel body, the annular flange is movably received in the annular receiving groove, the pressing member has elasticity and is provided between the annular flange of the barrel-shaped member and the annular receiving groove so as to make the barrel-shaped member be capable of floating in the passageway, the contacting member is provided in the barrel body of the barrel-shaped member, the plug has an inserting post which inserts into the receptacle and contacts the contacting member.

5. The electrical connection device of claim 1, further comprising:

a plurality of connectors, the plurality of the connectors being respectively mounted to the plurality of the first mounting portions of the first busbar and the plurality of the second mounting portions of the second busbar.

6. The electrical connection device of claim 1, wherein the first transmitting member comprises a plurality of first straddle type connectors which are fixed to the first base plate and are arranged along the up-down direction, the second transmitting member comprises a plurality of second straddle type connectors which are fixed to the second base plate and are arranged along the up-down direction.

7. The electrical connection device of claim 1, wherein the first transmitting member and the second transmitting member are arranged and spaced apart from each other along the left-right direction, the insulative housing of the first straddle type connector has a first side portion, the insulative housing of the second straddle type connector has a second side portion, the first side portion and the second side portion face each other and spaced apart from each other along the left-right direction, the guiding spacer has a first guiding oblique surface and a second guiding oblique surface which are spaced apart from each other along the left-right direction, a first distance taken between a front end the first guiding oblique surface and a front end of the second guiding oblique surface along the left-right direction is larger than a second distance taken between a rear end of the first guiding oblique surface and a rear end of the second guiding oblique surface along the left-right direction, the first guiding oblique surface is used to contact the first side portion and be capable of sliding on the first side portion, the second guiding oblique surface is used to contact the second side portion and be capable of sliding on the second side portion.

8. The electrical connection device of claim 7, wherein the first side portion and the second side portion each are an oblique surface, a first pitch taken between a front end of the first side portion and a front end of the second side portion along the left-right direction is larger than a second pitch taken between a rear end of the first side portion and a rear end of the second side portion along the left-right direction, the first side portion and the second side portion is formed therebetween with a snapping groove, when the first inserting plate and the second inserting plate respectively insert into the inserting groove of the first straddle type connector and the inserting groove of the second straddle type connector, the guiding spacer is snapped in the snapping groove, and the first guiding oblique surface and the second guiding oblique surface respectively surface contact the first side portion and the second side portion.

9. The electrical connection device of claim 1, wherein the rack busbar group further comprises a first engaging assembly and a second engaging assembly, the first engaging assembly makes the first inserting plate and the guiding spacer securely engaged together, the second engaging assembly makes the second inserting plate and the guiding spacer securely engaged together.

10. The electrical connection device of claim 9, wherein the first engaging assembly comprises a plurality of first nuts and a plurality of first bolts which pass through the first inserting plate and the guiding spacer and are respectively screwed to the plurality of first nuts, the second engaging assembly comprises a plurality of second nuts and a plurality of second bolts which pass through the second inserting plate and the guiding spacer and are respectively screwed to the plurality of second nuts.

11. An electrical connection device, comprising:

a busbar group comprising a first busbar and a second busbar, the first busbar having a first straddle type connector, the first straddle type connector being formed with an inserting groove whose upper end and lower end are in form of opened shape, the second busbar having a second straddle type connector, the second straddle type connector being formed with an inserting groove whose upper end and lower end are in form of opened shape; and a rack busbar group comprising a first rack busbar, a second rack busbar, a first inserting plate coupled to the first rack busbar via a first plug, and a second inserting plate coupled to the second rack busbar via a second plug, the first inserting plate and the second inserting plate respectively inserting into the inserting groove of the first straddle type connector and the inserting groove of the second straddle type connector so that the busbar group is capable of floating relative to the rack busbar group along an up-down direction.

12. An electrical connection device, comprising:

a busbar group comprising a first busbar and a second busbar, the first busbar having a first straddle type connector, the second busbar having a second straddle type connector; and a rack busbar group comprising a first rack busbar, a second rack busbar, a first inserting plate, a second inserting plate, a first floating module and a second floating module, the first inserting plate inserting into the first straddle type connector, the second inserting plate inserting into the second straddle type connector, the first floating module being used to couple the first rack busbar to the first inserting plate, the second floating module being used to couple the second rack busbar to the second inserting plate, so that the busbar group is capable of floating relative to the rack busbar group along a left-right direction.

* * * * *